United States Patent [19]

Neis et al.

[11] Patent Number: 4,521,974
[45] Date of Patent: Jun. 11, 1985

[54] TEMPERATURE STABLE ARCUATE BUBBLE GRAVITY SENSOR MOUNT

[75] Inventors: Thomas W. Neis, Phoenix; Harold L. Swartz, Glendale, both of Ariz.

[73] Assignee: Sperry Corporation, New York, N.Y.

[21] Appl. No.: 527,910

[22] Filed: Aug. 30, 1983

[51] Int. Cl.³ .............................................. G01C 9/24
[52] U.S. Cl. ........................................ 33/379; 33/365
[58] Field of Search ................. 33/379, 365, 377, 389, 33/125 T, 370, 371, 384; 200/215, 220, 153 A, 182

[56] References Cited

U.S. PATENT DOCUMENTS

| | | | |
|---|---|---|---|
| 2,854,762 | 10/1958 | Wright | 33/365 |
| 3,018,558 | 1/1962 | Hannan et al. | 33/365 |
| 3,497,950 | 3/1970 | Squire et al. | 33/379 |

FOREIGN PATENT DOCUMENTS 2451036  4/1976  Fed. Rep. of Germany ........ 33/365

Primary Examiner—Willis Little
Attorney, Agent, or Firm—Howard P. Terry

[57] ABSTRACT

A temperature stable apparatus for mounting an arcuate glass enclosed electrolytic bubble gravity sensor utilizes epoxy cement having a low temperature coefficient of expansion for bonding an end face of a post having a temperature coefficient of expansion equal to that of glass to the center of the glass enclosure of the sensor, and the other end of the post to the center of a rectangular aluminum plate, such that the longitudinal axis of the post is orthogonal to the plate and the plane of the arcuate axis of the enclosure, and such that a chord connecting the ends of the arcuate axis is parallel to the longitudinal axis of the plate.

7 Claims, 4 Drawing Figures

U.S. Patent    Jun. 11, 1985    4,521,974
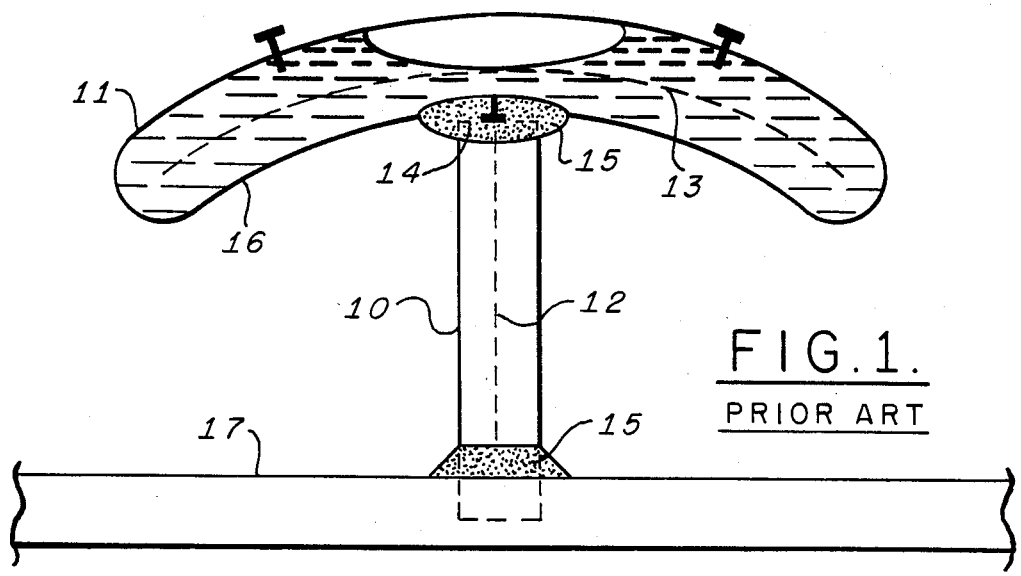
FIG.1.
PRIOR ART
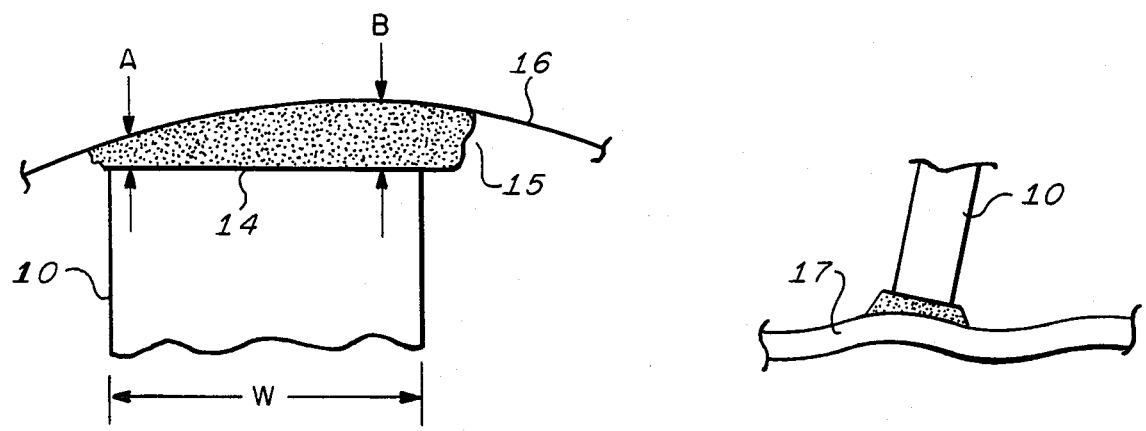
FIG.2.
PRIOR ART
FIG.3.
PRIOR ART
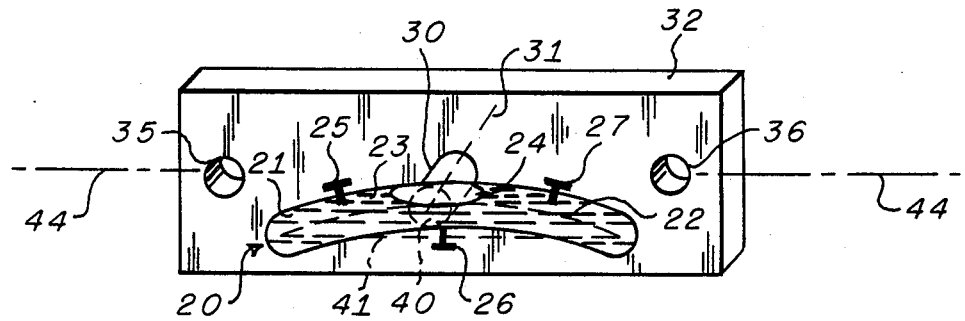
FIG.4.

TEMPERATURE STABLE ARCUATE BUBBLE GRAVITY SENSOR MOUNT

BACKGROUND OF THE INVENTION

1. Field of the Invention

The present invention relates generally to arcuate enclosed electrolytic bubble gravity sensors, and more particularly, to means for mounting such sensors to reduce errors arising from ambient temperature variations.

2. Description of the Prior Art

Arcuate enclosed electrolytic bubble gravity sensors have conventionally been mounted with metallic clips similar to miniature fuse holders, or by cementing the sensor in a grooved metallic fixture. Referring to FIG. 1, another mounting technique entails positioning a post 10 with respect to an arcuate bubble gravity sensor 11 such that a longitudinal axis 12 of the post 10 is parallel to the plane of an arcuate axis 13 of the sensor 11. One end of the post 10, having an end face 14 disposed in a plane orthogonal to the longitudinal axis 12, is bonded with an epoxy cement 15 to the central region of a concave arcuate surface 16 of the sensor 11. The other end of the post 10 is bonded with the epoxy cement 15 to a base plate 17 such that the longitudinal axis 12 of the post 10 is orthogonal to the plane of the base plate 17.

The above mounting mechanisms have proven satisfactory for applications such as gyro leveling wherein gravity sensing errors entailing a few minutes of arc are relatively innocuous, in view of the myriad of other acceleration, mass shift, and friction force errors.

However, when the mounting apparatus depicted in FIG. 1 is utilized in inclinometers or in systems for measuring the tilt or angle of deviation of substantially stationary structures, the sensor exhibits, with changes in ambient temperature, unacceptable deviations. Referring to FIG. 2, with continuing reference to FIG. 1, the problem resides in the difficulty of positioning the end face 14 of the post 10 against the concave arcuate surface 16 of the sensor 11 such that the epoxy cement 15 is uniformly distributed therebetween. In practice, the cement joint has been found to vary in thickness over its length. Since the epoxy cement 15 generally possesses a relatively high temperature coefficient of expansion (TCE), on the order of 20–30 micro in./in./°F., the additional expansion on one end of the cement joint produces angular displacement of the sensor 11 from the horizontal, resulting in erroneous readings. For example, if a width W of the post 10 is 0.200 inches, and the difference between a cement width A and a cement width B is 0.030 inches, which has been found to be typical, then for a 100° F. change in temperature ($\Delta T$), the change in angle ($\Delta \theta$) is:

$\Delta \theta = \text{Tan}^{-1} (B-A)(TCE)_W(\Delta T) = 0.0215$
degrees = 1.29 arc min.

Further, in response to temperature variations, the base plate 17 has been found to warp transversely, as exaggerated in FIG. 3, imparting, through the post 10, additional undesirable angular displacement of the sensor 11 from the horizontal.

Thus, there is a need for an apparatus for mounting an arcuate enclosed electrolytic bubble gravity sensor, which reduces errors arising from ambient temperature variations.

In the present inventors' copending application Ser. No. 527,908, entitled Tilt Sensor Null Adjusting Apparatus, also assigned to the assignee of the present invention, a tool for precisely leveling a tilt sensor is described. While capable of adjustment to a fraction of an arc minute, it is apparent this inherent precision may not be realized with the prior art sensor mounting.

SUMMARY OF THE INVENTION

The present invention provides a temperature stable apparatus for mounting an arcuate enclosed electrolytic bubble gravity sensor having an arcuate shaped enclosure possessing an arcuate axis disposed in a plane. The invention comprises a first means, having a longitudinal axis and a first and a second end, for mounting the sensor. The first end is bonded to the sensor so that the longitudinal axis is orthogonal to the plane in which the central arc of the enclosure is disposed. A means is utilized for bonding the first end of the first mounting means to the sensor. Additionally, a second means, fixed to the second end of the first mounting means, is employed for mounting the sensor.

A preferred embodiment of the invention is utilized with a sensor having an enclosure comprising glass. In this preferred embodiment, the first mounting means comprises a post having a temperature coefficient of expansion equal to that of glass, and an end face disposed in a plane orthogonal to the longitudinal axis of the post. A rectangular aluminum plate comprises the second mounting means, and a first epoxy cement having a low temperature coefficient of expansion comprises the bonding means. The first epoxy cement bonds the end face of the post to the center of the glass enclosure of the sensor, and a second epoxy cement having a low temperature coefficient of expansion fixes the other end of the post to the center of the aluminum plate. The longitudinal axis of the post is orthogonal to the aluminum plate and the plane in which the arcuate axis of the enclosure is disposed. A chord connecting the ends of the arcuate axis is parallel to a longitudinal axis of the rectangular aluminum plate.

In the present invention, since the longitudinal axis of the post is orthogonal to the plane of the arcuate axis of the enclosure, disparate thermal expansions of the cement, owing to a nonuniform distribution thereof, engender only harmless rotation of the sensor about the vertical. Accordingly, erroneous readings resulting from angular displacement of the sensor from the horizontal due to unequal expansions of the cement, are substantially eliminated in the present invention.

Further, due to the parallel disposition, in the present invention, of the plate to the plane of the arcuate axis of the enclosure, transverse warping of the plate resulting from ambient temperature variations engenders only harmless rotation of the sensor about the vertical. Accordingly, erroneous readings resulting from angular displacement of the sensor from the horizontal due to transverse warping of the plate, are substantially eliminated in the present invention.

BRIEF DESCRIPTION OF THE DRAWINGS

FIG. 1 is a schematic diagram of an arcuate enclosed electrolytic bubble gravity sensor and a prior art apparatus for the mounting thereof.

FIG. 2 is a partial section of FIG. 1 illustrating a nonuniform layer of cement between an end face of a post and a concave surface of the sensor.

FIG. 3 is a partial section of FIG. 1 illustrating transverse warping of a plate resulting from ambient temperature variations.

FIG. 4 is a perspective view of a preferred embodiment of the present invention.

Identical numerals in different figures refer to identical elements.

DESCRIPTION OF THE PREFERRED EMBODIMENTS

The present invention provides a temperature stable means for mounting an arcuate enclosed electrolytic bubble gravity sensor.

Referring to FIG. 4, an arcuate enclosed electrolytic bubble gravity sensor 20 comprises an arcuate-shaped enclosure 21 having an central arc 22 disposed in a plane. The sensor 20 further comprises an electrolytic fluid 23 and a gaseous bubble 24 disposed in the enclosure 21, and spaced electrical contacts, such as contacts 25, 26, and 27. The sensor 20 operates in a well-known fashion to measure angular displacement from the horizontal.

With continuing reference to FIG. 4, a preferred embodiment of the invention comprises a post 30 having a longitudinal axis 31. A first end of the post 30 is fixed to a plate 32. Preferably, the plate 32 is rectangular in shape, has two mounting holes 35 and 36 for mounting to a sensor system (not shown), and comprises aluminum having a temperature coefficient of expansion (TCE) of approximately 12 micro in./in./°F. The first end of the post 30 is preferably fixed to the center of the plate 32, with the longitudinal axis 31 of the post 30 orthogonal to the plate 32.

A second end of the post 30 is bonded to the arcuate-shaped enclosure 21 of the sensor 20 such that the longitudinal axis 31 of the post 30 is orthogonal to the plane of the arcuate axis 22 of the enclosure 21. Preferably, the second end of the post 30 comprises an end face 40 disposed in a plane orthogonal to the longitudinal axis 31. The end face 40 is preferably bonded to the center of the enclosure 21 such that a chord 41 connecting the ends of the arcuate axis 22 is parallel to a longitudinal axis 44 of the plate 32.

The post 30 preferably comprises a material having a TCE equal to that of the material comprising the enclosure 21. Preferably, epoxy cement is utilized to secure the post 30 between the plate 32 and the enclosure 21. The epoxy cement for bonding the post 30 to the enclosure 21 preferably has a TCE equal to that of the post 30 and the enclosure 21; and the epoxy cement for fixing the post 30 to the plate 32 preferably has a TCE between that of the post 30 and the plate 32.

Alternatively, the epoxy cements for securing the post 30 between the plate 32 and the enclosure 21 are chosen to be the same and to have the lowest possible TCE. With the enclosure 21 comprising glass having a TCE of approximately 6 micro in./in./°F., and the plate 32 comprising aluminum having a TCE of approximately 12 micro in./in./°F., an epoxy cement having a TCE of approximately 14 micro in./in./°F. has been found satisfactory.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A temperature stable bubble gravity sensor comprising:
    an electrolytic bubble gravity sensor having an arcuate shaped enclosure disposed in a plane passing through a central arc,
    first mounting means, having a longitudinal axis and a first and second end, for mounting said sensor, said first end being bonded to said sensor so that said longitudinal axis is substantially orthogonal to said plane in which said central arc is disposed, whereby measuring errors arising from ambient temperature variations are reduced;
    means for bonding said first end to said sensor; and
    second mounting means, fixed to said second end of said first mounting means, for mounting said first mounting means and sensor.

2. An apparatus as in claim 1 wherein said first end of said first mounting means comprises an end face disposed in a plane substantially orthogonal to said longitudinal axis.

3. An apparatus as in claim 2 wherein said bonding means comprises a first epoxy cement disposed between said end face and said sensor.

4. An apparatus as in claim 3 wherein said first mounting means comprises a post.

5. An apparatus as in claim 4 wherein said post comprises a material having a temperature coefficient of expansion equal to that of a material comprising said arcuate-shaped enclosure.

6. An apparatus as in claim 5 wherein said first epoxy cement has a temperature coefficient of expansion equal to that of said arcuate-shaped enclosure.

7. An apparatus as in claim 6 further comprising a second epoxy cement fixing said second end to said second mounting means having a termperature coefficient of expansion between that of said material comprising said post and that of second mounting means.

* * * * *